(12) United States Patent
Lu

(10) Patent No.: US 11,435,058 B2
(45) Date of Patent: Sep. 6, 2022

(54) LAMP CAPABLE OF RADIATING RADIAL PATTERN

(71) Applicant: ZHONGSHAN YUSEN LIGHTING TECHNOLOGY CO., LTD., Zhongshan (CN)

(72) Inventor: Jianquan Lu, Baise (CN)

(73) Assignee: ZHONGSHAN YUSEN LIGHTING TECHNOLOGY CO., LTD., Zhongshan (CN)

(*) Notice: Subject to any disclaimer, the term of this patent is extended or adjusted under 35 U.S.C. 154(b) by 0 days.

(21) Appl. No.: 17/584,292

(22) Filed: Jan. 25, 2022

(65) Prior Publication Data
US 2022/0146075 A1  May 12, 2022

(30) Foreign Application Priority Data
Dec. 16, 2021 (CN) .......................... 202123194641.X (51) Int. Cl.
| | |
|---|---|
| *F21V 5/00* | (2018.01) |
| *F21V 21/08* | (2006.01) |
| *F21V 7/00* | (2006.01) |
| *F21S 9/03* | (2006.01) |
| *F21V 5/04* | (2006.01) |
| *F21Y 103/33* | (2016.01) |
| *F21Y 107/30* | (2016.01) |
| *F21W 111/023* | (2006.01) |

(52) U.S. Cl.
CPC ............ *F21V 7/0025* (2013.01); *F21S 9/037* (2013.01); *F21V 5/046* (2013.01); *F21V 21/0824* (2013.01); *F21W 2111/023* (2013.01); *F21Y 2103/33* (2016.08); *F21Y 2107/30* (2016.08)

(58) Field of Classification Search
CPC ................ F21V 5/046; F21V 21/0824; F21W 2111/023; F21Y 2103/33; F21Y 2107/30
See application file for complete search history.

(56) References Cited

U.S. PATENT DOCUMENTS

2019/0323669 A1* 10/2019 Tang ..................... F21V 31/005

* cited by examiner

*Primary Examiner* — Sean P Gramling (57) ABSTRACT

A lamp capable of radiating radial pattern is disclosed, comprising a base, a transparent lampshade provided with multiple outer convex lens portions on its circumferential side and an inner recesses provided between every two adjacent outer convex lens portions, and a luminous lamp assembly located between the base and the transparent lampshade and provided with multiple luminous lamp beads. Each lamp bead is arranged corresponding to each inner recess, so that light emitted by each lamp bead respectively enters the outer convex lens portion located on both sides of each corresponding inner recess and then is refracted and converged thereby to form a radiation beam located outside the transparent lampshade and gradually shrinking from the inside to the outside, thus to radiate a brightening pattern in a circumferentially radial shape, which can greatly improve the aesthetic property and also bring people a more impressive visual impact.

9 Claims, 13 Drawing Sheets

LAMP CAPABLE OF RADIATING RADIAL PATTERN

TECHNICAL FIELD

The present disclosure relates to the technical field of lamps, and in particular to a lamp capable of radiating radial pattern.

RELATED ART

Along with improvement of people's living standard, lamps that satisfy the application requirements and match with the application scenarios are used in different scenarios. For example, a variety of beautifying lamps are usually used to beautify the landscape of parks, gardens, streets, squares and other places, such as spotlights capable of projecting patterns or texts, or color-changing brightening lamps, or simple pure-color brightening lamps and etc.

However, the existing spotlights capable of projecting patterns or texts are projected and displayed through reserving patterns or texts on the lamps and then with the help of the bright light while the existing color-changing or simple pure-color brightening lamps are relatively simple in beautification effects, thus the existing brightening lamps cannot meet people's requirements for multiple use effects such as brightening and aesthetic property. Therefore, those skilled in the art urgently need to develop a lamp capable of radiating patterns through its own structure to meet more application requirements.

SUMMARY

In view of the above-mentioned existing technical problems, the solution to be solved by the present disclosure is to provide a lamp capable of radiating radial pattern.

In order to solve the above technical problems, the present disclosure is achieved by the following technical solution.

A lamp capable of radiating radial pattern comprises a base, and further comprises:

a transparent lampshade covered on the base and provided with a plurality of outer convex lens portions protruding outwardly on its peripheral side, wherein an inner recess is provide between every two adjacent outer convex lens portions;

a luminous lamp assembly arranged on a peripheral side of the base and located between the base and the transparent lampshade, wherein the luminous lamp assembly is provided with a plurality of luminous lamp beads, each of the luminous lamp beads is arranged corresponding to each of the inner recesses, so that the light emitted by each of the luminous lamp beads respectively enters the outer convex lens portions located on both sides of each corresponding inner recess and then is refracted and converged through the outer convex lens portions on both sides of each inner recess to form a radiation beam located outside the transparent lampshade and gradually shrinking from the inside to the outside.

The lamp capable of radiating radial pattern as mentioned above, wherein the plurality of outer convex lens portions is circumferentially distributed along a peripheral side of the transparent lampshade.

The lamp capable of radiating radial pattern as mentioned above, wherein each of the outer convex lens portions comprises an upper side surface, a lower side surface located on a lower side of the upper side surface, and an outer convex curved surface protruding outwardly located between the upper side surface and the lower side surface.

The lamp capable of radiating radial pattern as mentioned above, wherein the transparent lampshade is provided with an accommodating cavity for accommodating and connecting the base, and a toroidal portion located between the accommodating cavity and the outer convex lens portions, wherein the toroidal portion is integrally formed with the outer convex lens portions.

The lamp capable of radiating radial pattern as mentioned above, wherein a center position of each luminous lamp bead is arranged collinearly with both a center position of each inner recess and a center position of the transparent lampshade.

The lamp capable of radiating radial pattern as mentioned above, wherein the lamp capable of radiating radial pattern further comprises a power-supplying module arranged on the base, the power-supplying module is connected to the luminous lamp assembly for supplying electric power to the luminous lamp assembly.

The lamp capable of radiating radial pattern as mentioned above, wherein an upper convex portion protruding upwardly is provided on the middle position of the base, an accommodating groove is formed in the upper convex portion; and the power-supplying module comprises:

a power-storing unit arranged within the accommodating groove, a power-generating unit arranged on an upper side of the upper convex portion, an converting unit arranged within the accommodating groove and located on a side of the power-storing unit, wherein the converting unit is connected with the power-generating unit, the power-storing unit and the luminous lamp assembly for converting and transmitting electric energy generated by the power-generating unit to the power-storing unit, and also converting and transmitting the electric energy stored in the power-storing unit to the luminous lamp assembly.

The lamp capable of radiating radial pattern as mentioned above, wherein an outer convex positioning portion protruding outwardly is provided on a peripheral side edge of the base, and a lower side of the transparent lampshade is provided with a positioning notch that is matched with the convex positioning portion for fixing the transparent lampshade.

The lamp capable of radiating radial pattern as mentioned above, wherein the base is further provided with a first upper convex annular portion located inside the outer convex positioning portion and protruding upwardly, and a second upper convex annular portion located inside the first upper convex annular portion and protruding upwardly; wherein a lower concave annular groove is formed between the second upper convex annular portion and the first upper convex annular portion;

the lower side of the transparent lampshade is further provided with a lower convex annular portion extended into the lower concave annular groove, and an upper concave annular groove located between the lower convex annular portion and the positioning notch and recessed upwardly for accommodating the first upper convex annular portion;

a first sealing connection adhesive is provided between the lower convex annular portion and the lower concave annular groove for sealing and connecting a gap between the above two; a second sealing connection adhesive is provided between the first upper convex annular portion and the upper concave annular groove for sealing and connecting a gap between the above two, and a gap between the outer convex positioning portion and the positioning notch.

The lamp capable of radiating radial pattern as mentioned above, wherein the lamp capable of radiating radial pattern further comprises a connecting-inserting assembly detachably connected to the lower side of the base for supporting and inserting;

the connecting-inserting assembly comprises an adapter detachably connected to the lower side of the base, and an inserting-connecting member detachably connected to a lower side of the adapter.

Compared to the existing technology, the present disclosure has the following advantages:

1. In the lamp capable of radiating radial pattern according to the present disclosure, by arranging each luminous lamp bead and each inner recess correspondingly, light emitted by each of the luminous lamp beads is respectively entered into the outer convex lens portions located on both sides of each corresponding inner recess, and then the light is refracted and converged through the outer convex lens portions on both sides of each inner recess to form a radiation beam located outside the transparent lampshade and gradually shrinking from the inside to the outside, thus to radiate a brightening pattern in a circumferentially radial shape, which can greatly improve the aesthetic property and also bring people a more impressive visual impact, thereby greatly meeting more practical needs and facilitating further innovation and development of industries.

2. In the lamp capable of radiating radial pattern according to the present disclosure, by matching and connecting the outer convex positioning portion with the positioning notch, and the purpose is to directionally assemble and connect the transparent lampshade with the base, so that the luminous lamp beads on the luminous lamp assembly are accurately arranged corresponding to the inner recesses on the transparent lampshade, thus to avoid that the radial patterns emitted through the outer convex lens portions are disordered caused by the displacement.

DETAILED DESCRIPTION

The present disclosure will be further described in detail hereafter in the specific embodiments in combination with the drawings.

As shown in FIG. 1 to FIG. 13, a lamp capable of radiating radial pattern comprises a base 1, a transparent lampshade 2 and a luminous lamp assembly 3.

Specifically, the transparent lampshade 2 is covered on the base 1 and a plurality of convex lens portions 21 protruding outwardly are provided on its peripheral side, and an inner recess 22 is formed between every two adjacent convex lens portions 21. The luminous lamp assembly 3 is arranged on a peripheral side of the base 1 and located between the base 1 and the transparent lampshade 2, and a plurality of luminous lamp beads 31 are provided on the luminous lamp assembly 3. Each of the luminous lamp beads 31 is arranged corresponding to each of the inner recesses 22, so that the light emitted by each of the luminous lamp beads 31 respectively enters the outer convex lens portion 21 located on both sides of each corresponding inner recess 22 and then is refracted and converged through the convex lens portion 21 on both sides of each of the inner recesses 22 to form a radiation beam located outside the transparent lampshade 2 and gradually shrinking from the inside to the outside, thus to radiate a brightening pattern in a circumferentially radial shape, which can greatly improve the aesthetic property of the present disclosure, and can also bring people a more impressive visual impact, thereby greatly meeting more practical needs and facilitating further innovation and development of industries.

Figure 5:
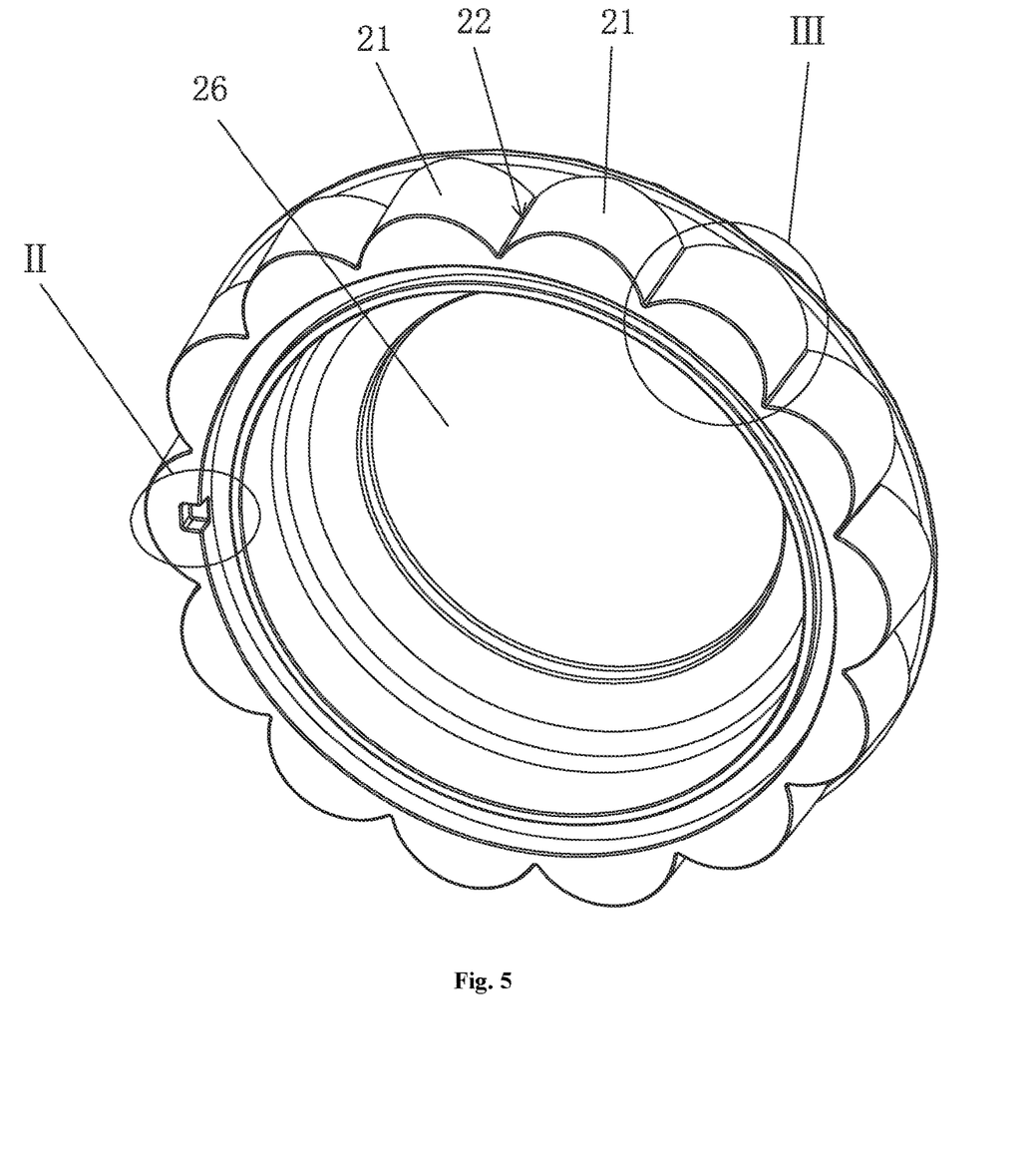
FIG. 5 is a perspective view of a transparent lampshade of the lamp capable of radiating radial pattern according to the present disclosure.

Further, the plurality of outer convex lens portions 21 are circumferentially distributed along a peripheral side of the transparent lampshade 2, and a purpose herein is to facilitate manufacture and production and also to facilitate the light beam patterns emitted by the cooperation of the luminous lamp assembly 3 and the transparent lampshade 2 to form circumferentially radial patterns.

Figure 6:
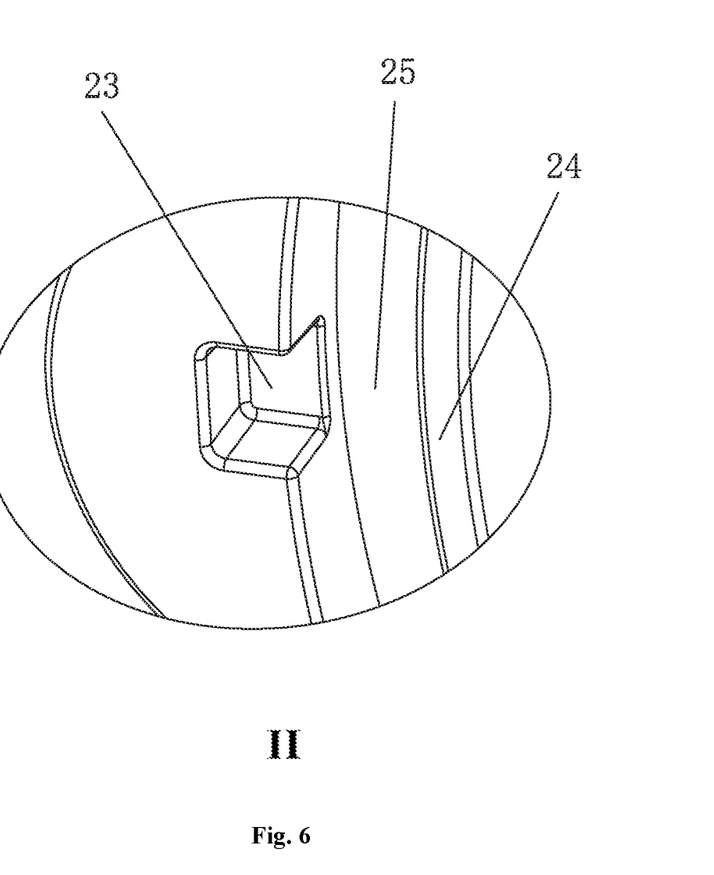
FIG. 6 is partial enlarged view II of FIG. 5.
Figure 7:
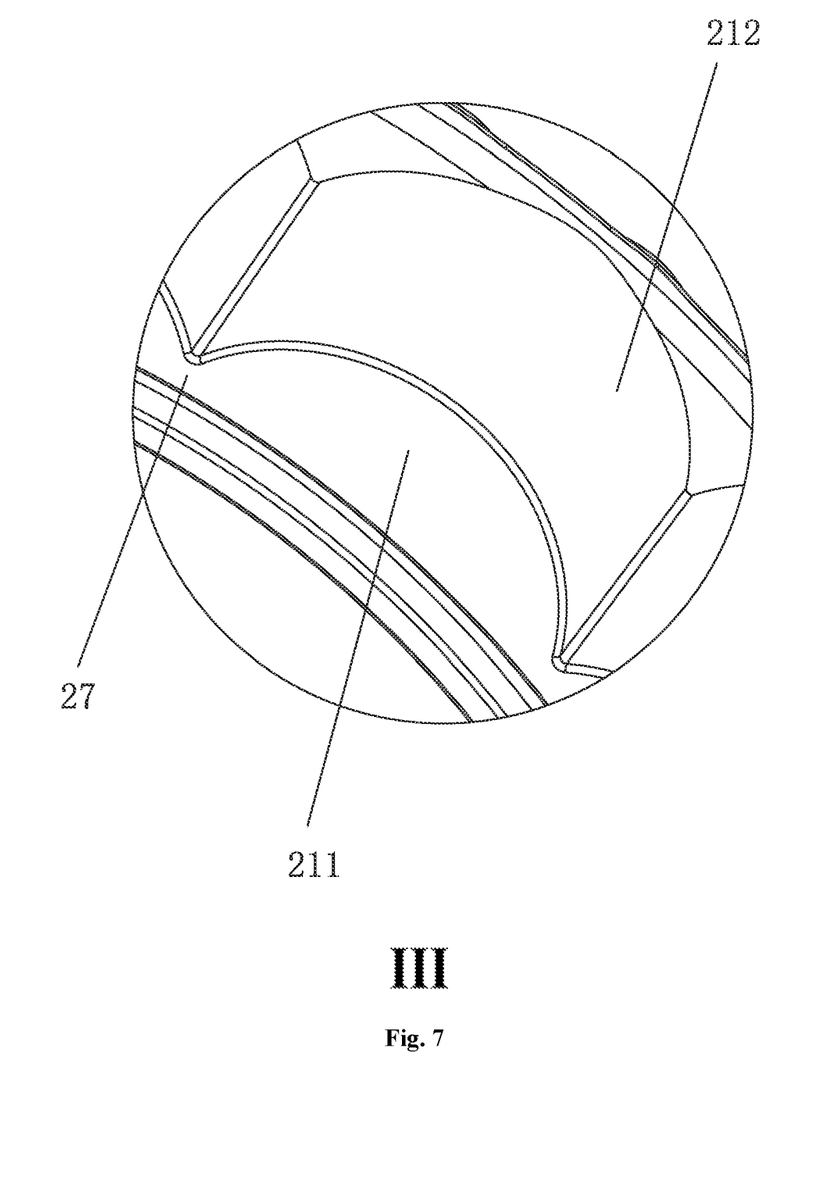
FIG. 7 is partial enlarged view III of FIG. 5.

Furthermore, each of the outer convex lens portions 21 comprises an upper side surface (not marked in the figures), a lower side surface 211 located on a lower side of the upper side surface (not marked in the figures), and an outer convex curved surface 212 located between the upper side surface (not marked in the figures) and the lower side surface 211 and protruding outwardly. The advantage herein is to meet the needs of light refraction.

Furthermore, the transparent lampshade 2 is provided with an accommodating cavity 26 for accommodating and connecting the base 1 and a toroidal portion 27 located between the accommodating cavity 26 and the outer convex lens portions 21. The toroidal portion 27 is integrally formed with the outer convex lens portions 21, which has the advantage of improving the overall strength of the transparent lampshade 2, and further refracting the light emitted from the luminous lamp beads 31 through the cooperation of the toroidal portion 27 and the outer convex lens portions 21.

Figure 12:
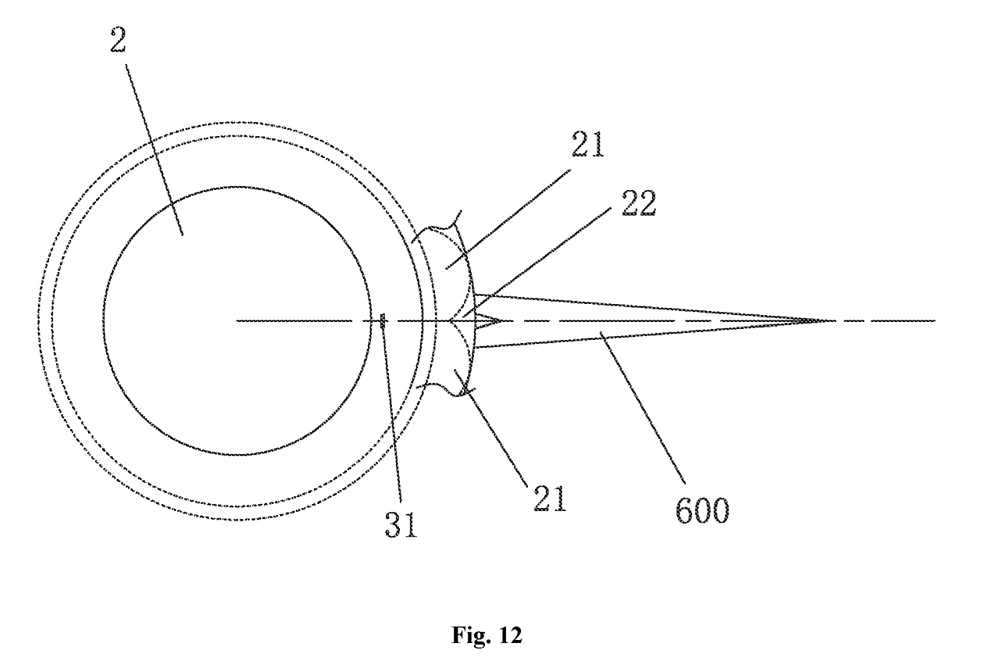
FIG. 12 is a schematic view that light emitted by luminous lamp beads in the lamp capable of radiating radial pattern are refracted and condensed by convex lens portions to form a radiation beam according to the present disclosure.
Figure 13:
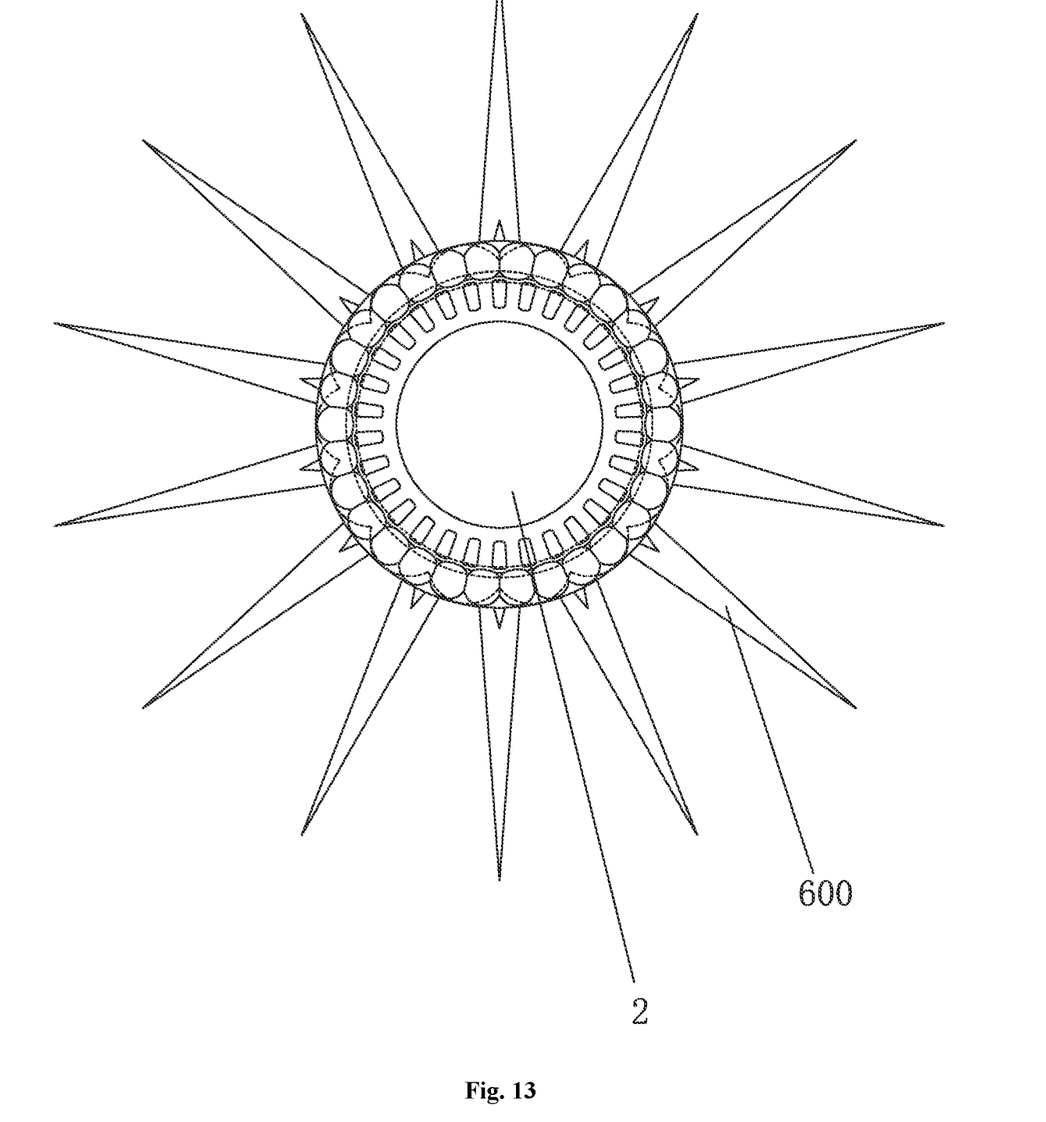
FIG. 13 is a schematic view that the lamp capable of radiating radial pattern of the present disclosure radiates patterns under a brightening state.

Furthermore, a center position of each luminous lamp bead 31 is arranged collinearly with both a center position of each corresponding inner recess 22 and a center position of the transparent lampshade 2. A purpose herein is to increase the concentration rate of the light beams refracted by the outer convex lens portions 21 on both sides of each inner recess 22, thereby facilitating formation of the radiation beams located outside the transparent lampshade 2 and gradually shrinking from the inside to the outside.

Figure 3:
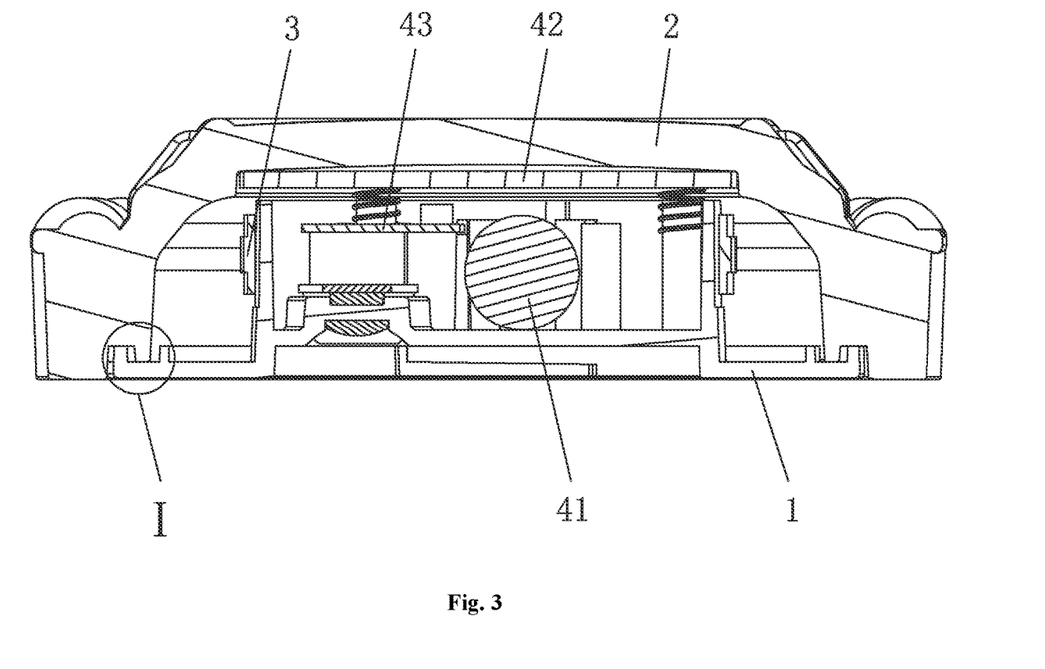
FIG. 3 is a cross-sectional view of the lamp capable of radiating radial pattern when a connecting-inserting assembly is hidden.

Furthermore, the lamp capable of radiating radial pattern further comprises a power-supplying module 4 arranged on the base 1. The power-supplying module 4 is connected with the luminous lamp assembly 3 and used for supplying electric power to the luminous lamp assembly 3. A purpose of using the power-supplying module 4 is to supply electric power to the luminous lamp assembly 3. Of course, the power-supplying module 4 may have multiple power supply modes, such as battery for power supply, solar-powered generation for power supply, or outer electric source power supply.

Figure 9:
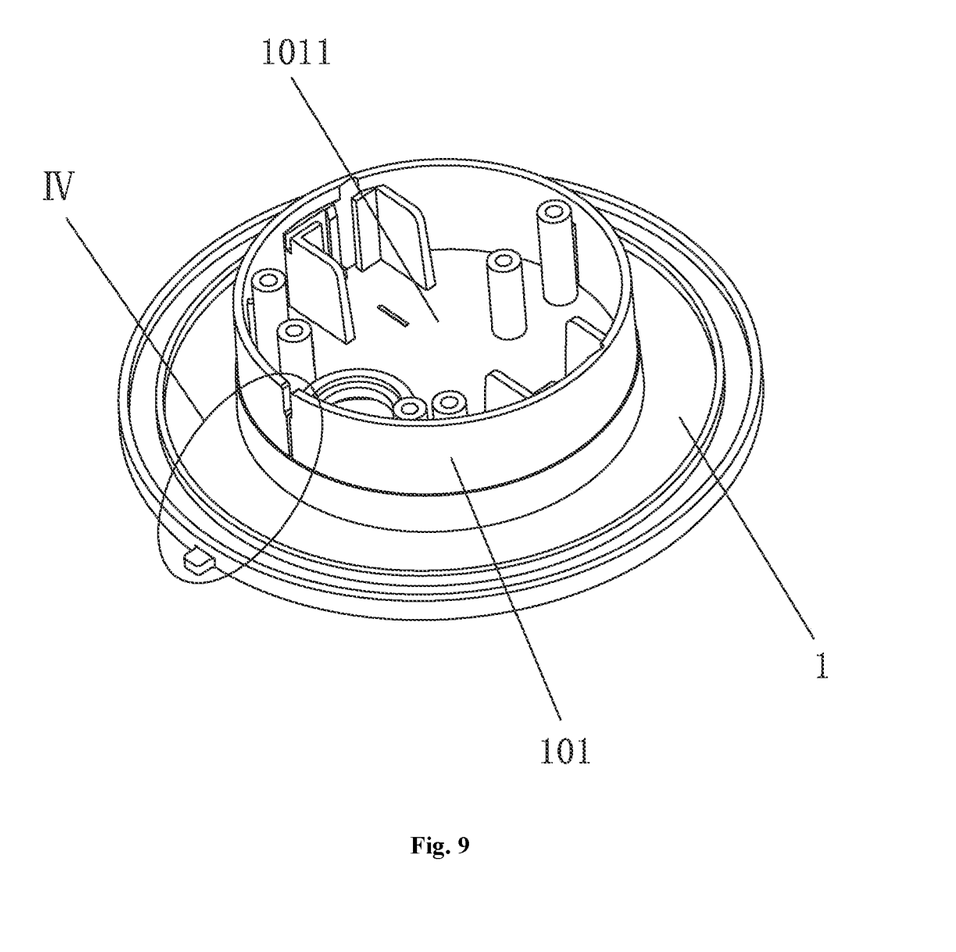
FIG. 9 is a perspective view of a base of the lamp capable of radiating radial pattern according to the present disclosure.

Furthermore, an upper convex portion 101 is provided on the middle position of the base 1, and an accommodating groove 1011 is formed in the upper convex portion 101.

Figure 8:
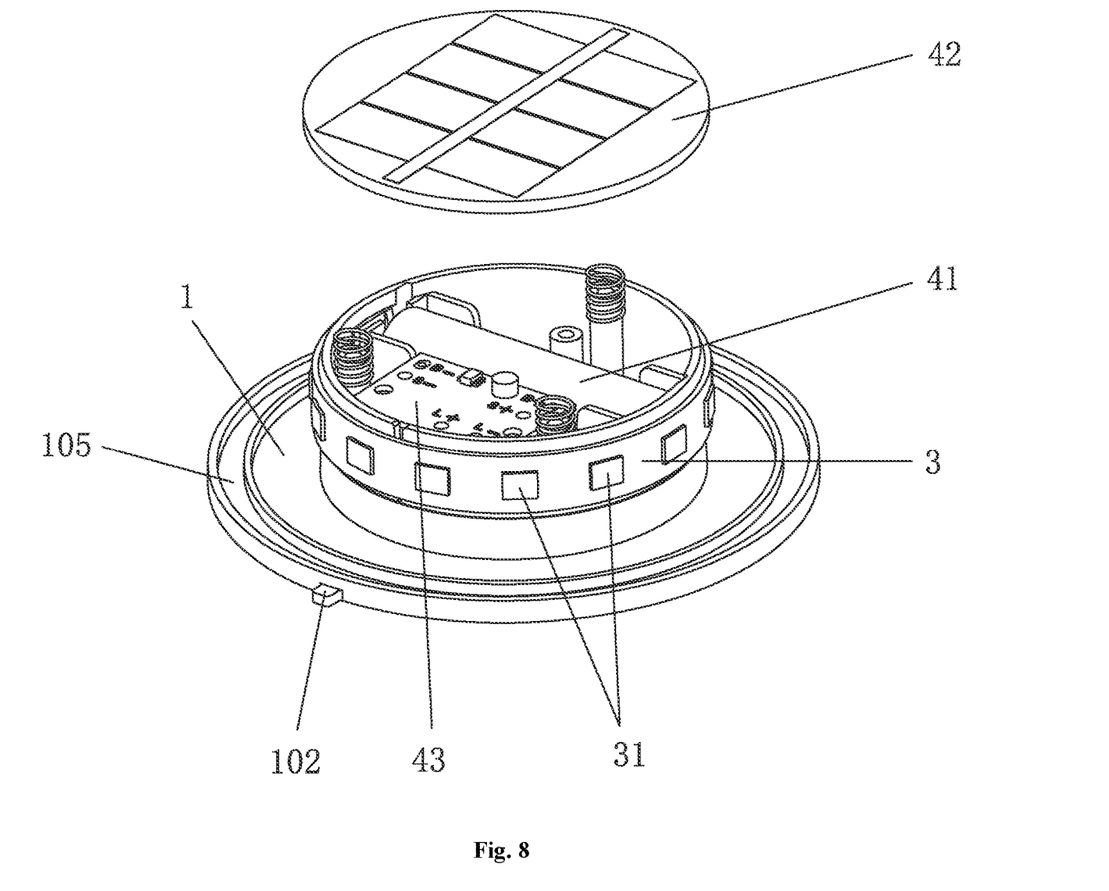
FIG. 8 is partial exposed view of the lamp capable of radiating radial pattern according to the present disclosure when the transparent lampshade and the connecting-inserting assembly are hidden.

The power-supplying module 4 comprises a power-storing unit 41, a power-generating unit 42 and a converting unit 43. The power-storing unit 41 is arranged within the accommodating groove 1011, the power-generating unit 42 is arranged on an upper side of the upper convex portion 101, and the converting unit 43 is arranged within the accommodating groove 1011 and located on a side of the power-storing unit 41. The converting unit 43 is connected with the power-generating unit 42, the power-storing unit 41 and the luminous lamp assembly 3 for converting and transmitting the electric energy generated by the power-generating unit 42 to the power-storing unit 41, and also converting and transmitting the electric energy stored in the power-storing unit 41 to the luminous lamp assembly 3. The power-storing unit 41 is a storage battery, the power-generating unit 42 is a solar powered electric-generating panel, and the converting unit 43 is a PCB (Printed Circuit Board) board. The purpose of the power-supplying module 4 is to use the solar powered electric-generating panel for generating electric energy and to use the storage battery for storing the electric energy generated by the solar powered electric-generating panel, thus to supply the stored electric energy to the luminous lamp assembly 3 to achieve the self-powered lighting purpose, thereby greatly facilitating outdoor use.

Figure 10:
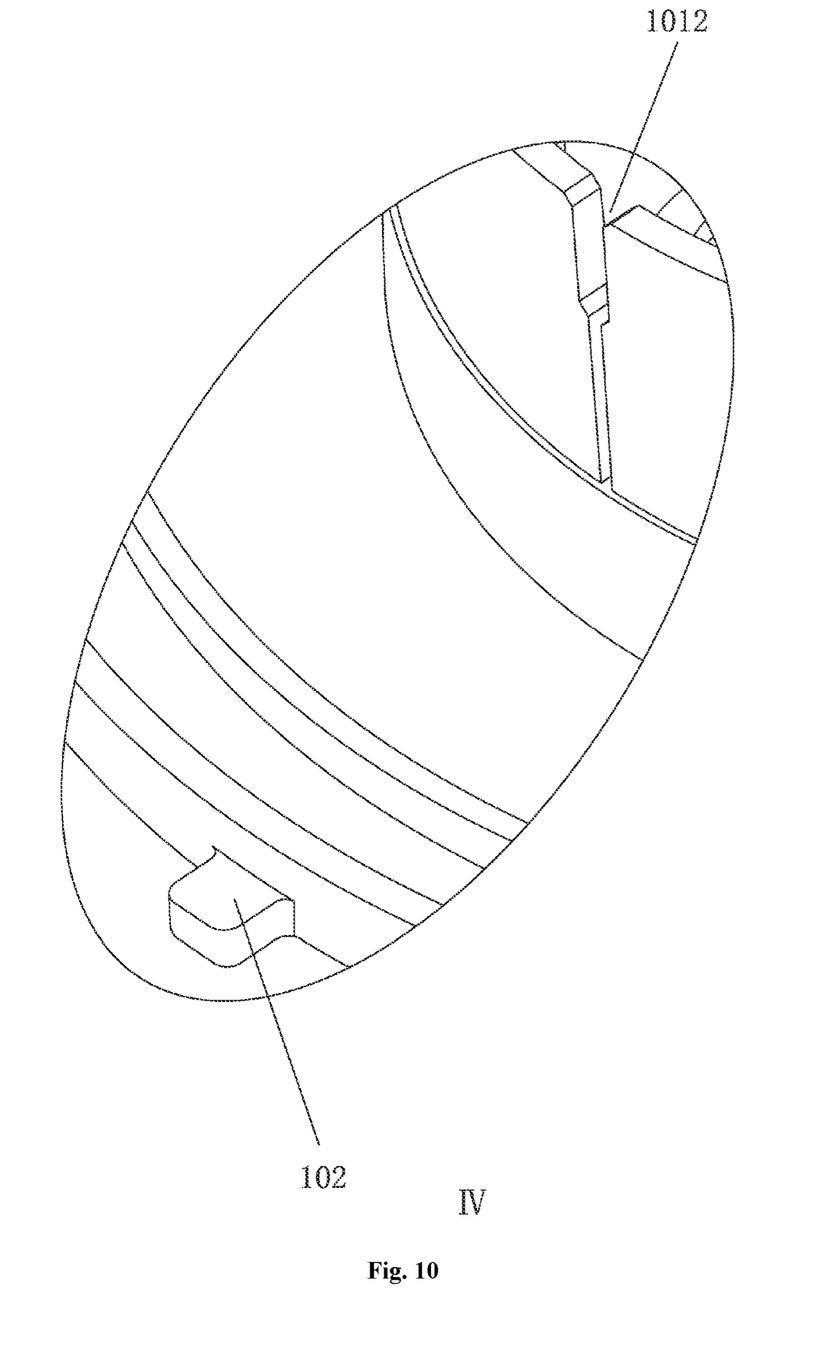
FIG. 10 is partial enlarged view IV of FIG. 9.
Figure 11:
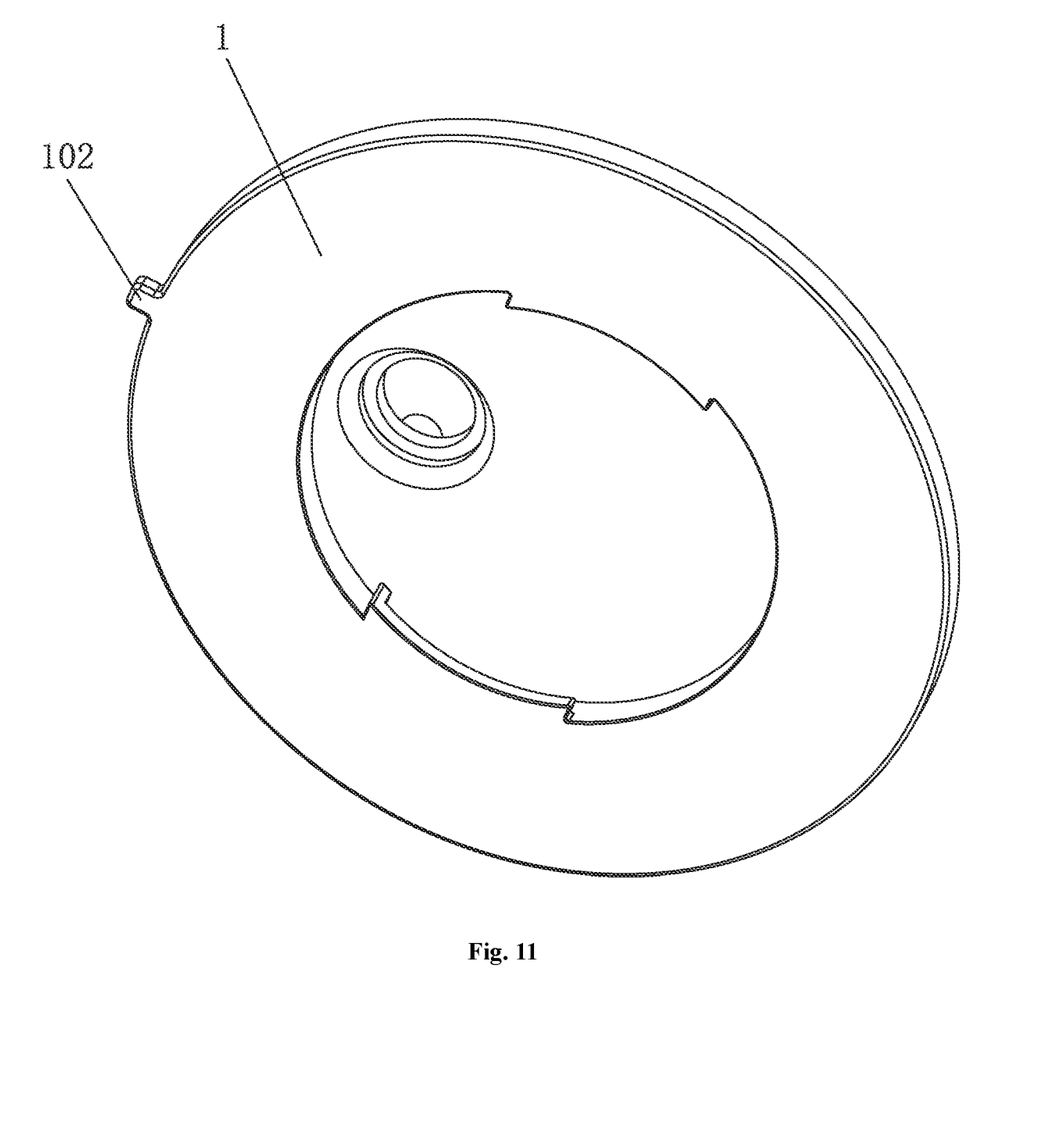
FIG. 11 is another perspective view of the base of the lamp capable of radiating radial pattern according to the present disclosure from another aspect.

Furthermore, an avoiding connection notch 1021 that communicates with the accommodating groove 1011 is provided on a circumferential edge of the upper convex portion 101 for a connection of the converting unit 43 and the luminous lamp assembly 3. The advantage of using the avoiding connection notch 1021 is to facilitate the connection between the luminous lamp assembly 3 and the converting unit 43.

The luminous lamp assembly 3 is arranged on an outer peripheral side of the upper convex portion 101, and the purpose is to facilitate the assembly work.

Furthermore, an outer convex positioning portion 102 protruding outwardly is provided on a peripheral side edge of the base 1.

The lower side of the transparent lampshade 2 is further provided with a positioning notch 23 that can match with the outer convex positioning portion 102 for fixing the transparent lampshade 2. A purpose herein is to directionally assemble and connect the transparent lampshade 2 with the base 1, so that the luminous lamp beads 31 on the luminous lamp assembly 3 are accurately arranged corresponding to the inner recesses 22 on the transparent lampshade 2, thus to avoid that the radial patterns emitted through the outer convex lens portions 21 are disordered caused by the displacement.

Furthermore, the base 1 is further provided with a first upper convex annular portion 103 located inside the outer convex positioning portion 102 and protruding upwardly, and a second upper convex annular portion 104 located inside the first upper convex annular portion 103 and protruding upwardly. A lower concave annular groove 105 is formed between the second upper convex annular portion 104 and the first upper convex annular portion 103.

Figure 4:
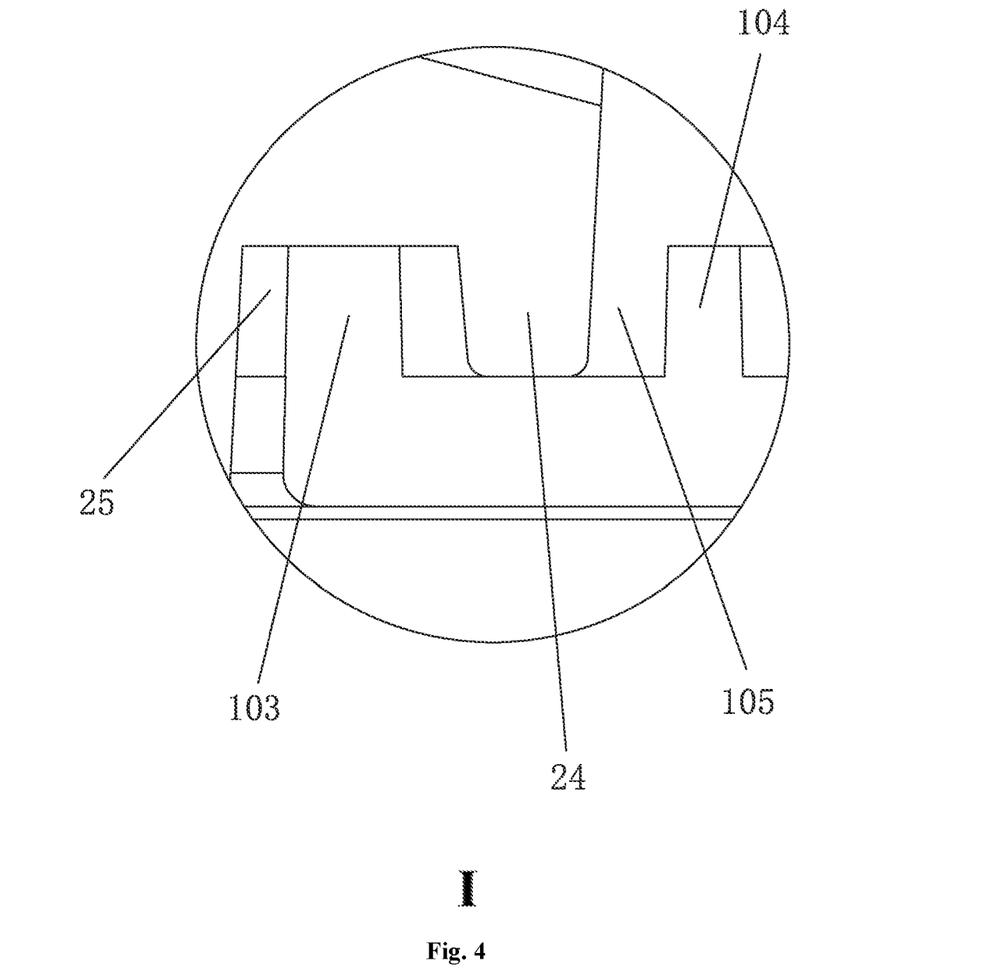
FIG. 4 is partial enlarged view I of FIG. 3.

The lower side of the transparent lampshade 2 is further provided with a lower convex annular portion 24 that can be extended into the lower concave annular groove 105, and an upper concave annular groove 25 located between the lower convex annular portion 24 and the positioning notch 23 and recessed upwardly for accommodating the first upper convex annular portion 103.

A first sealing connection adhesive is provided between the lower convex annular portion 24 and the lower concave annular groove 105 for sealing and connecting a gap between the above two.

A second sealing connection adhesive is provided between the first upper convex annular portion 103 and the upper concave annular groove 25 for sealing and connecting a gap between the above two and a gap between the outer convex positioning portion 102 and the positioning notch 23. The advantage of the sealing connection adhesive is to achieve a double adhesive sealing connection effect between the internal and the external, and thus a double waterproof effect has been achieved.

Furthermore, the transparent lampshade 2 is made of transparent glass or transparent plastic, which has the advantage of facilitating transmitting light and meeting the usage requirements.

Figure 1:
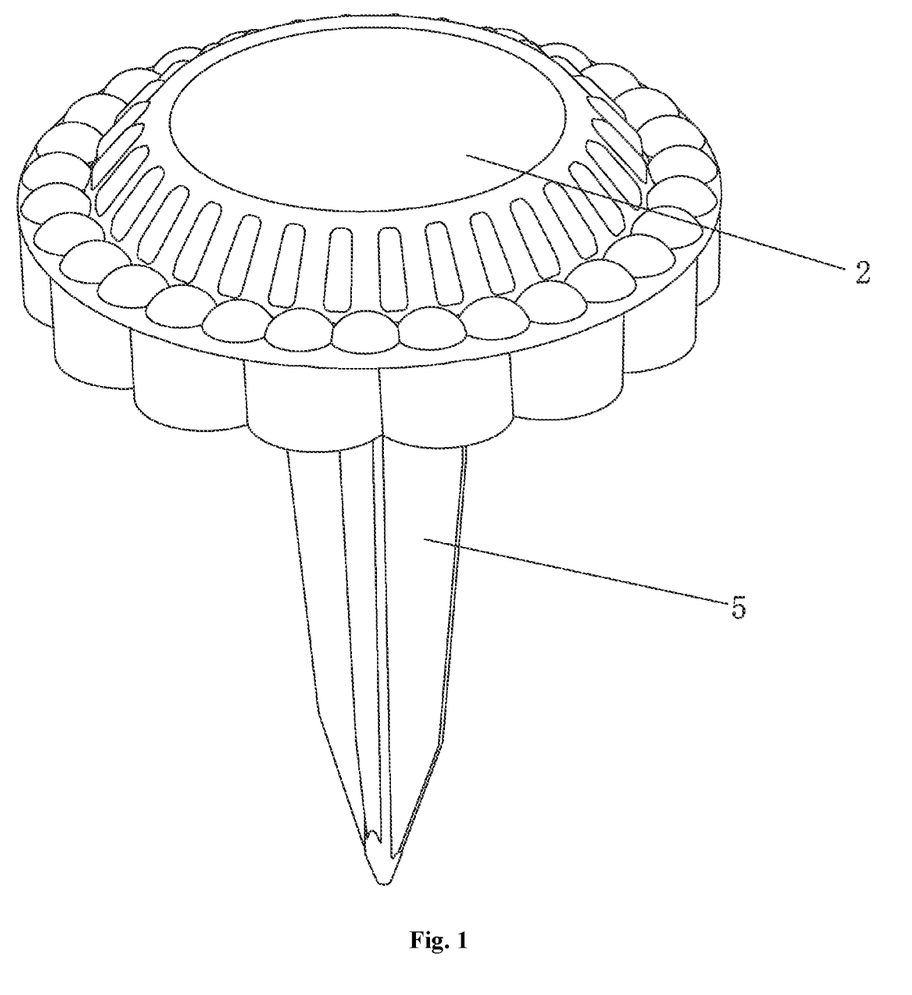
FIG. 1 is a perspective view of a lamp capable of radiating radial pattern according to the present disclosure.
Figure 2:
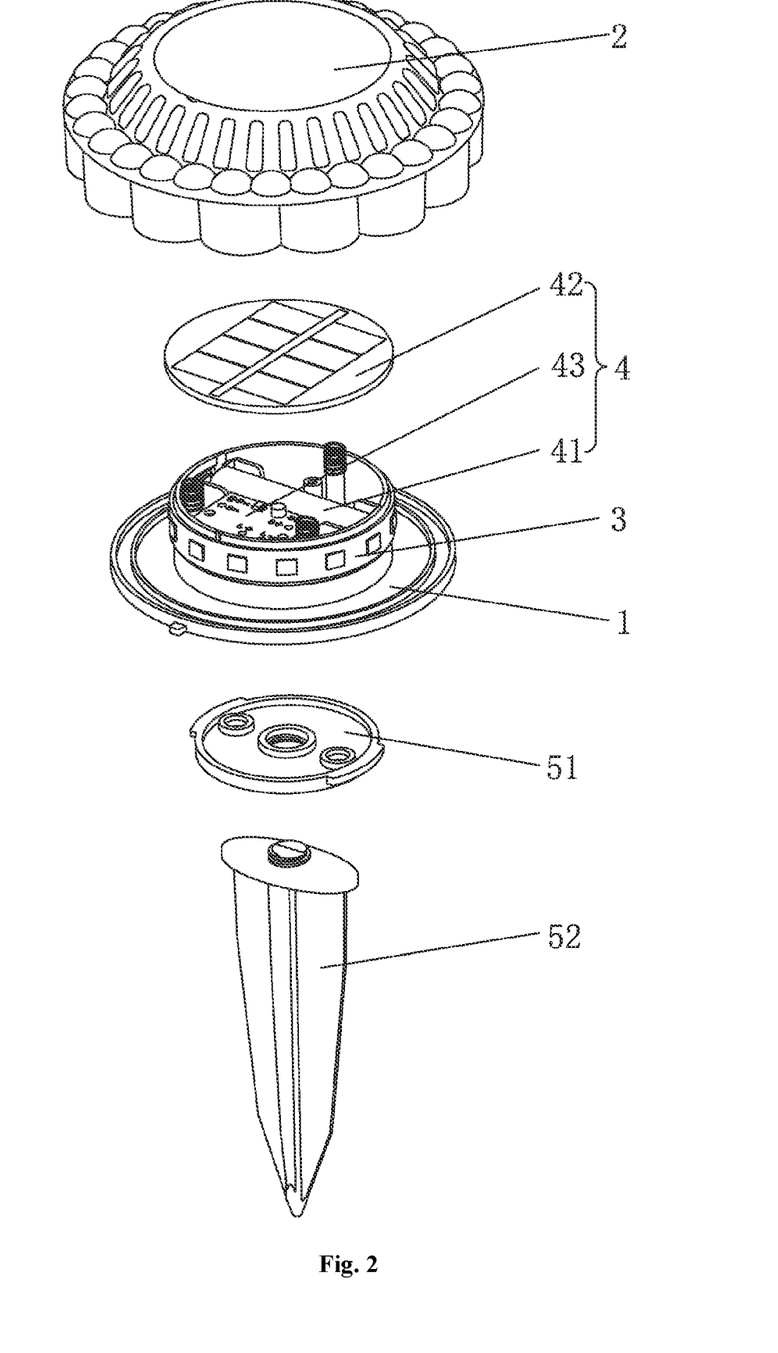
FIG. 2 is a partial exploded view of the lamp capable of radiating radial pattern according to the present disclosure.

Furthermore, the lamp capable of radiating radial pattern further comprises a connecting-inserting assembly 5 detachably connected to the lower side of the base 1 for support and insertion. The connecting-inserting assembly 5 comprises an adapter 51 detachably connected to the lower side of the base 1 and an inserting-connecting member 52 detachably connected to a lower side of the adapter 51. The purpose of using the adapter 51 and the inserting-connecting member 52 is to easily replace the inserting-connecting member 52 and facilitate the assembled work while adapting to more inserting scenarios for improving the applicability.

In summary, the embodiments of the present disclosure have been described in detail, but the present disclosure is not limited to the above embodiments. Even if various changes are made to the present disclosure, they still fall into the protective scope of the present disclosure.

What is claimed is:

1. A lamp capable of radiating radial pattern, comprising a base, wherein the lamp capable of radiating radial pattern further comprises:
   a transparent lampshade covered on the base and provided with a plurality of outer convex lens portions protruding outwardly on its peripheral side, wherein an inner recess is provided between every two adjacent outer convex lens portions;
   a luminous lamp assembly arranged on a peripheral side of the base and located between the base and the transparent lampshade, wherein the luminous lamp assembly is provided with a plurality of luminous lamp beads,
   each of the luminous lamp beads is arranged corresponding to each of the inner recesses, so that the light emitted by each of the luminous lamp beads respectively enters the outer convex lens portions located on both sides of each corresponding inner recess and then is refracted and converged through the outer convex lens portions on both sides of each inner recess to form a radiation beam located outside the transparent lampshade and gradually shrinking from the inside to the outside;

wherein a center position of each luminous lamp bead is arranged coilinearly with both a center position of each inner recess and a center position of the transparent lampshade.

2. The lamp capable of radiating radial pattern according to claim 1, wherein the plurality of outer convex lens portions is circumferentially distributed along a peripheral side of the transparent lampshade.

3. The lamp capable of radiating radial pattern according to claim 2, wherein each of the outer convex lens portions comprises an upper side surface, a lower side surface located on a lower side of the upper side surface, and an outer convex curved surface protruding outwardly located between the upper side surface and the lower side surface.

4. The lamp capable of radiating radial pattern according to claim 3, wherein the transparent lampshade is provided with an accommodating cavity for accommodating and connecting the base, and a toroidal portion located between the accommodating cavity and the outer convex lens portions, wherein the toroidal portion is integrally formed with the outer convex lens portions.

5. The lamp capable of radiating radial pattern according to claim 1, wherein the lamp capable of radiating radial pattern further comprises a power-supplying module arranged on the base, the power-supplying module is connected to the luminous lamp assembly for supplying electric power to the luminous lamp assembly.

6. The lamp capable of radiating radial pattern according to claim 5, wherein an upper convex portion protruding upwardly is provided on the middle position of the base, an accommodating groove is formed in the upper convex portion; and the power-supplying module comprises:
a power-storing unit arranged within the accommodating groove,
a power-generating unit arranged on an upper side of the upper convex portion, a converting unit arranged within the accommodating groove and located on a side of the power-storing unit, wherein the converting unit is connected with the power-generating unit, the power-storing unit and the luminous lamp assembly for converting and transmitting electric energy generated by the power-generating unit to the power-storing unit, and also converting and transmitting the electric energy stored in the power-storing unit to the luminous lamp assembly.

7. The lamp capable of radiating radial pattern according to claim 1, wherein an outer convex positioning portion protruding outwardly is provided on a peripheral side edge of the base, and a lower side of the transparent lampshade is provided with a positioning notch that is matched with the convex positioning portion for fixing the transparent lampshade.

8. The lamp capable of radiating radial pattern according to claim 7, wherein the base is further provided with a first upper convex annular portion located inside the outer convex positioning portion and protruding upwardly, and a second upper convex annular portion located inside the first upper convex annular portion and protruding upwardly; wherein a lower concave annular groove is formed between the second upper convex annular portion and the first upper convex annular portion;

the lower side of the transparent lampshade is further provided with a lower convex annular portion extended into the lower concave annular groove, and an upper concave annular groove located between the lower convex annular portion and the positioning notch and recessed upwardly for accommodating; the first upper convex annular portion;

a first sealing connection adhesive is provided between the lower convex annular portion and the lower concave annular groove for sealing and connecting a gap between the above two;

a second sealing connection adhesive is provided between the first upper convex annular portion and the upper concave annular groove for sealing and connecting a gap between the above two, and a gap between the outer convex positioning portion and the positioning notch.

9. The lamp capable of radiating radial pattern according to claim 1, wherein the lamp capable of radiating radial pattern further comprises a connecting-inserting assembly detachably connected to the lower side of the base for supporting and inserting;

the connecting-inserting assembly comprises an adapter detachably connected to the lower side of the base, and an inserting-connecting member detachably connected to a lower side of the adapter.

\* \* \* \* \*